Figure 1:
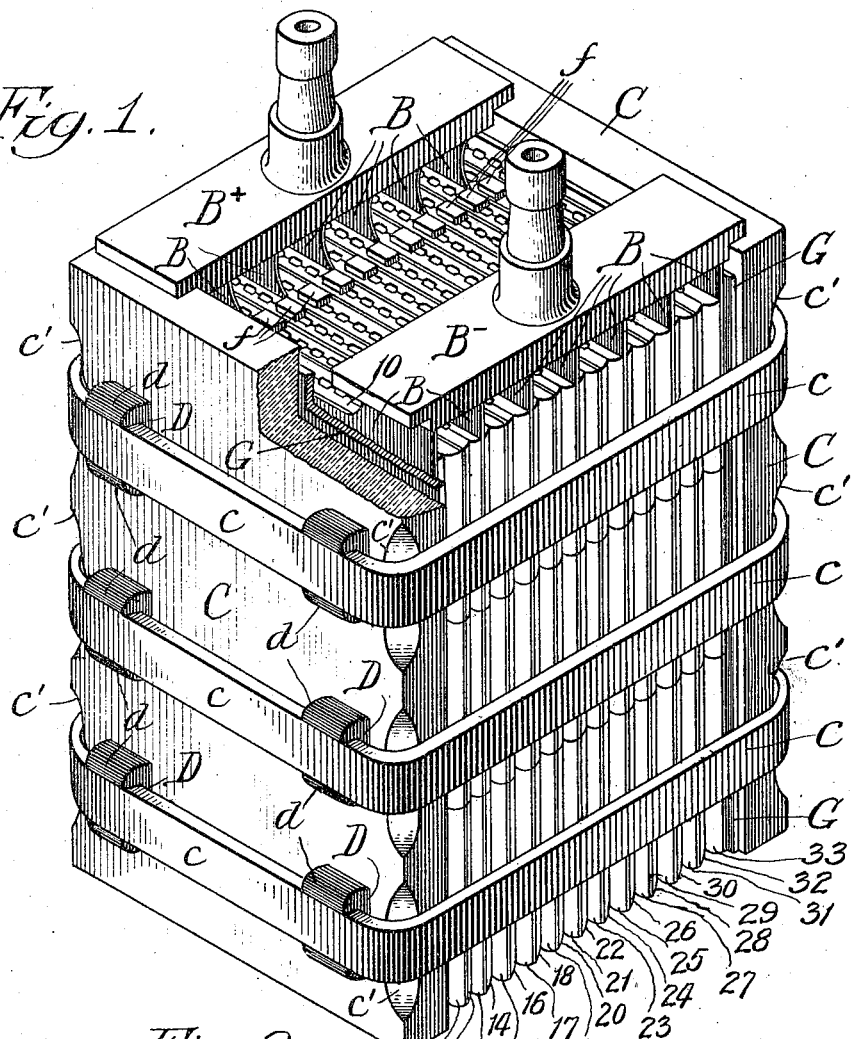

G. J. JOHNSON.
SECONDARY BATTERY.
APPLICATION FILED AUG. 28, 1911.

1,029,015.  Patented June 11, 1912.
2 SHEETS—SHEET 1.

Witnesses:
John Endere
Edith Wilcox

Inventor:
G. J. Johnson
By J. M. Roberts
his Atty.

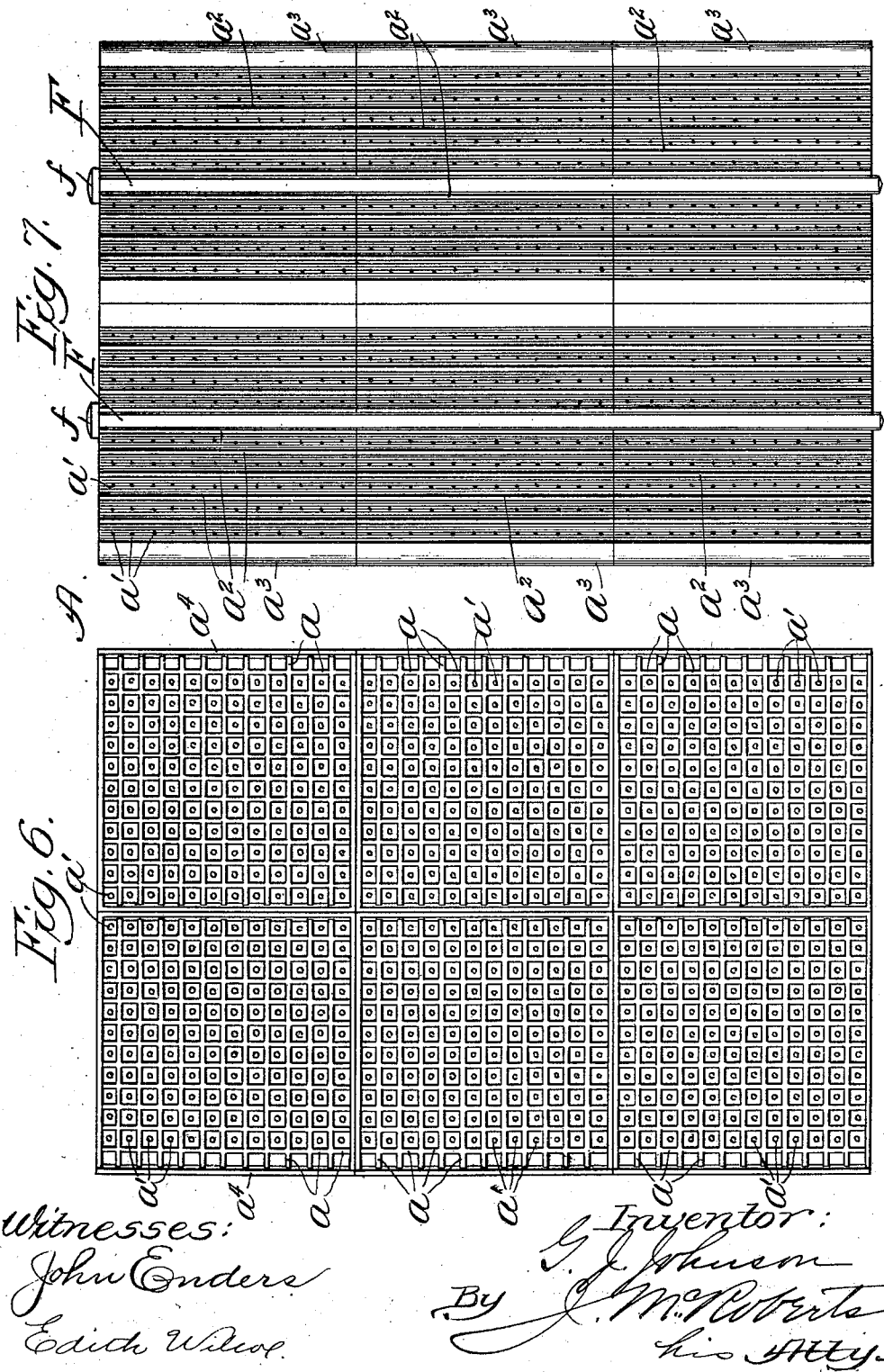

UNITED STATES PATENT OFFICE.

GUSTAVUS J. JOHNSON, OF CHICAGO, ILLINOIS, ASSIGNOR TO E. C. TOURTELOT, OF CHICAGO, ILLINOIS.

SECONDARY BATTERY.

1,029,015.

Specification of Letters Patent. Patented June 11, 1912.

Application filed August 28, 1911. Serial No. 646,443.

*To all whom it may concern:*

Be it known that I, GUSTAVUS J. JOHNSON, a citizen of the United States, residing at Chicago, in the county of Cook and State of Illinois, have invented certain new and useful Improvements in Secondary Batteries, of which the following is a specification, reference being had therein to the accompanying drawing.

This invention relates in general to the type of secondary battery disclosed in my Patent No. 969,876 dated Sept. 13, 1910 to which reference may be had for the general construction of the assembled elements; the present invention, however, contemplates a battery of larger type designed for heavier work and meeting higher efficiency to that end, and in which the porous plates are preferably sectional.

My present invention comprises certain novel and improved features of construction of the plates; means to hold the plates in position to prevent slippage; means to provide elasticity of elements to insure a constant reliable and uniform contact of the porous plates with their conductor sheets, and to other features which will be apparent from the disclosure herein.

It is a well known fact to scientists skilled in battery practice that the general deficiency of all secondary batteries, both of the Planté and Faure types, is in a large measure due to the shedding of the active material owing to contraction and expansion incident to charges and discharges of the elements and that such shedding of the active material leaves a portion of their remaining material without contact with its supporting grid or rib by reason of which defect such batteries constantly deteriorate eventually involving their ultimate destruction. In the type of battery with which this invention deals a large portion of the active material is chambered in the recesses of the porous plates, and to prevent possible shedding of such active material as exists between the chambered strata and the conductor sheet I provide a porous plate with the outside impervious rib slightly raised or extended above the chambered strata. The purpose of this construction is not to form an envelop, as the said raised rib must under no circumstances be high enough to come in contact with the associated conductor sheet but leave a space for the passage of the current and the free circulation of electrolyte direct to the active material between its impervious edge and the conductor sheet.

In order to promote conductance and further decrease internal resistance I provide a small cavity or hole extending through the structure of the plate approximately in the center of each one of the recesses or cellular receptacles in which the active material is chambered. The successful construction and operation of the battery requires that the porosity of the plate be maintained the same as in my previous patent heretofore referred to, the holes being placed in the bottom of the chambers or cavities in the present invention simply to assist in the initial action of the current during charge and discharge and thus to facilitate the working of the battery at relatively higher normal charge and discharge-rates than could otherwise be done safely. In the practice of C. H. Clare Patent No. 894,602 open channels are made through the element to provide general circulation and equilibration of the electrolyte in a battery containing insulating plates previously covered by Clare's Patent No. 717,351. The holes or cavities in the porous plates described in my invention serve no such purpose, being simply small openings through which a small or minute portion of the active material of that individual cavity is exposed to the electrolyte for direct action. Circulation of electrolyte in my invention will be amply taken care of by capillary action through the vertical channels caused by the temperature rise incidental to charge or discharge. I hereby disclaim all matter contained in the claims of these Patents Nos. 894,602 and 717,351 as being immaterial to my invention.

To maintain the plates in their original intended position with relation to their conductor sheets I provide suitable hard rubber keys which coöperate with the plates in any suitable manner for this purpose, and preferably as herein disclosed.

By reason of the porosity of the plates in a Hatch type of battery all the oxids become immediately active after their formation, yet in previous methods of construction it has been found impossible to fully utilize all of the stored energy contained therein owing to loss of contact between the lead peroxids in the positive plates and their conductor sheets. The imperative necessity for such contact was fully recognized by the original experimenters with batteries constructed on the Hatch principle although they all failed to find suitable means technically and commercially feasible for the purpose. It will be noted that the practice under Hatch Patent No. 585,473 was confined to the use of elastic rubber bands with which to hold the assembled elements together. It is well known to those skilled in battery practice that soft vulcanized rubber while at tension in the sulfuric acid electrolyte retains its elasticity only for a short time and so his practice failed. Later experimenters, such as those under the Clare Patents Nos. 650,808 and 717,351, after realizing the non-dependence of such elastic bands placed metallic bands upon the elements instead, but failed to provide for the necessary elasticity required by the elements for successful operation. By my present invention I provide for permanent elasticity of the elements by placing between the end-supporting plate and the outer metallic conductor sheet on each side of the element a slab or cushion of soft elastic vulcanized rubber approximately of the same area as the conductor sheet, the cushion being held in immovable position by the non-elastic lead-antimony bands placed around the elements and tightened with suitable wedging blocks impervious to the electrolyte and placed between said bands and the outer side of the end-supporting plates. The expansion of the active material in the formation process of any successfully working secondary battery will be found to be as high as 40%, f its original volume. This phenomenon accounts for the continuous growth or elongation in the Planté type of positive plates, and for the breaking asunder of the supporting grid in the Faure type of plate, whenever the active material in such plate is held laterally closely confined between separators. In my improved type of battery with the active material largely chambered within a rigid nonductile support, and with all plates laterally disposed it is obvious that all expansion will take the path of least resistance and move laterally toward the end supporting plates, where the compression of the elastic cushions will provide the space needed. It will of course be necessary to vary the thickness of such cushions in the same measure that plates are added or removed to make a larger or smaller element.

The means for embodying and utilizing the principle of elasticity as herein described I claim broadly, as this principle has never heretofore been successfully applied by anyone to lateral expansion within a secondary battery.

Figure 2:
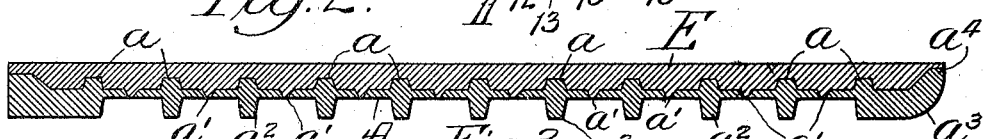
Figure 3:
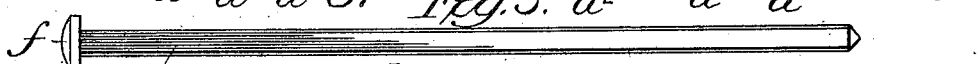
Figure 4:
Figure 5:
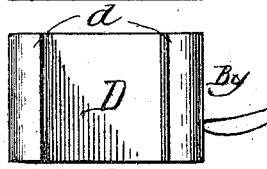

In the accompanying drawings:—Figure 1 is a perspective view showing the assembled elements, the usual containing jar and insulated bearings for the element being omitted for purposes of clearer illustration; Fig. 2 is an enlarged view in cross section showing one of the plates and its filling of active material, one side of the plate being shown with a square edge, the other side with a chamfered edge which is the outer edge of the sectional plate and is slightly raised above the general level of the partitions between the cavities; Fig. 3 is a detail view showing one of the keys shown in Fig. 1 to maintain the plates against transverse movement or slippage with relation to their position against their conductor sheets; Fig. 4 is an enlarged side view of a vulcanite band-wedging block having lugs at top and bottom to straddle the bands; Fig. 5 is an enlarged front view of such wedging block; Fig. 6 is a view of the chambered side of six assembled porous plates comprising one side of an electrode or compound plate, and Fig. 7 is a view of the outer or reverse side of the same with keys in position to prevent their transverse displacement.

In the drawings the complete element is composed of the porous permeable di-electric plates numbered 10 to 33 inclusive arranged substantially as shown, with metallic electrodes or conductor strips B, preferably in the form of lead antimony sheets between them and extending to the element terminals; certain of the plates are of like polarity, as positive, and lead to the positive terminal B+; and others are of like but opposite polarity, as negative, and lead to the negative terminal B—, and certain pairs of plates constitute compound plates, all as set forth in my prior Patent No. 969,876. The porous plates and electrodes are assembled with end-supporting plates C, preferably of glass, though I do not limit myself to such material as any rigid substance impervious to the electrolyte may be used. The assembled elements are bound together in place by metallic binders $c$ in the form of lead antimony bands placed around the parts and tightened by suitable wedges D having upper and lower lugs or lips $d$ straddling the bands. The glass plates are provided with tapering chamfers $c'$ on their outer corners for supporting and wedging the bands.

In the present invention the porous plates are sectional, each being composed of a plurality, here six, of sections or plates A which have active material E or material intended to be active upon their inner faces or surfaces, being provided with suitable pockets or receptacles for that purpose, as by crossed ridges $a$ forming a cellular surface thereon, and each cell is provided with a hole or cavity $a'$ to promote conductance, assist in the initial action of the current and decrease the internal resistance as above stated. The electrodes are of course in close contact with the face of the active material. The outer faces or surfaces of the porous plates are provided with ribs $a^2$ running lengthwise thereof and providing abutments for the plates, the abutments on adjacent plates of unlike polarity forming channels for the free circulation of the electrolyte contained in the usual jar or receptacle (not shown). The electrodes or conducting plates B are of equal width or transverse cross-section to the assembled porous plates as shown clearly in Fig. 1 in contra-distinction to practice under my Patent No. 969,876; it is of course understood that the number of voltaic couples or plates may be varied, as also will be the associated electrodes.

In the batteries constructed in accordance with my previous patent the exposed or outside edge of each porous plate is made impervious to the electrolyte and active material and is made non-conducting to the electric current by any suitable agency such as therein described, and these edges are also chamfered or beveled from the reverse side forward for the purpose therein stated. In the present invention the outside or exposed edges of the porous plates are similarly prepared and treated, the chamfer or bevel being shown at $a^3$, and in order to prevent the shedding of active material above the chambered strata I provide a rib $a^4$ which is raised slightly above the ridges $a$ of the chambered strata comprising the available surface area for holding active material but not high enough to form an envelop or to come in contact with the associated conductor, leaving a space for the passage of the current and the access of the electrolyte between the rib and sheet, all as will be apparent from Fig. 2.

To maintain the plates in their predetermined position with relation to their conductor sheets I provide keys F of suitable hard rubber and adapted to fit the channel between an opposite pair of adjacent ribs $a^2$ upon the outer sides of any two adjacent plates as illustrated in Figs. 1 and 7, these keys being provided with suitable heads $f$ holding them against longitudinal displacement in the channels. Each key interlocks with the opposed sections of a pair of plates and prevent the plates or their constituent sections from moving upon each other laterally with relation to their conductor sheets.

Interposed between each outer conductor sheet and the end-supporting plate on each end of the element is an elastic di-electric cushion, preferably in the form of a compressible elastic vulcanite sheet or plate G, each cushion being originally of the same approximate area as that of the conductor sheet or assembled porous plates, but the same may by reason of compression exerted by the element during formation or while under discharge become slightly larger than the associated end conductor sheet as clearly shown in Fig. 1. These cushions are held in place by pressure and rigidity of the bands $c$ and their wedging blocks exerted upon the end supporting plates, and the said cushions take care of and compensate at all times for the constant movement of the component parts of the assembled element whether the same be expanding or contracting, by providing the necessary elasticity for compression and obviate the most serious fault or inability heretofore inherent in batteries of the Hatch principle or type. The use or application of these cushions is an advantage in all battery elements of the "Faure" or "Brush" types preventing the active material from shedding by holding the separators firmly to the plates during charges as well as discharges. The use or application of metallic bands is not necessary to battery elements, as the compressible cushions may be safely placed between the outer separator and the sides of the containing jars adjacent thereto; any suitable or feasible manner of application will also prevent breakage of the grids and buckling of the plates in Faure or Brush types of batteries.

The present description discloses the principles of my invention in connection with apparatus representing a practical embodiment of its several features, but I desire to have it understood that the apparatus shown is merely illustrative and that the invention may be exemplified in other ways.

I claim:—

1. A non-metallic, electrically non-conducting plate for supporting active material in an electric battery, said plate having its body permeable to the electrolyte and provided with perforated chambers for the reception and retention of said active material, and having its outer edge impervious to the electrolyte.

2. A non-conducting plate for supporting active material in contact with the conductor of the electrodes of an electric battery, said plate having its body permeable to the electrolyte and provided with chambers for the reception and retention of said active material, and having its outer edge extended above the chambered strata of the active material.

3. A non-conducting plate for supporting active material in contact with the conductor of the electrodes of an electric battery, said plate having its body permeable to the electrolyte and provided with chambers for the reception and retention of said active material, and having its outer edge beveled and extended above the chambered strata of the active material.

4. A non-conducting plate for supporting active material in contact with the conductor of the electrodes of an electric battery, said plate having its body permeable to the electrolyte and provided with perforated recesses or chambers for the reception and retention of said active material, and having its outer edge beveled and extended above the line of the recesses or chambers.

5. A storage battery composed of non-conducting plates to which the active material is applied, conducting plates in contact with said active material, channels on the outer faces of the plates, and keys in the channels of opposite plates.

6. A storage battery composed of sectional porous non-conducting plates to the inner faces of which the active material of the battery is applied, conducting plates in contact with said active material, alined channels on the outer faces of the sections of opposite plates, a key in the channels of opposite sections of opposite plates, and end supporting plates and bands to hold the several parts assembled.

7. A storage battery composed of sectional porous non-conducting plates to the inner faces of which the active material of the battery is applied, conducting plates in contact with said active material, ribs on the outer faces of the sections of the plates to form channels for the electrolyte, a headed hard rubber key in a channel between opposite sections of the plates, end supporting plates and bands to hold the several parts assembled.

8. A secondary battery composed of non-conducting plates to which the active material is applied, conductors in contact with said active material, supports, and elastic cushions between the supports and outer conductors.

9. A secondary battery composed of non-conducting plates to which the active material of the battery is applied, conducting plates in contact with said active material, end plates, elastic cushions between the end plates and adjacent conducting plates, metallic bands to hold the several parts assembled, and wedges between the bands and end plates.

10. A storage battery composed of porous non-conducting plates to the inner faces of which the active material of the battery is applied, conducting plates in contact with said active material, rigid end plates having corner chamfers, a cushion of elastic vulcanized rubber between each end plate and adjacent conducting plate, metallic bands in the corner chamfers of the end plates to hold the several parts assembled.

11. A storage battery consisting of compound electrodes composed of porous non-conducting plates to the inner faces of which the active material of the battery is applied and conducting plates in contact with said active material, the porous plates having ribs on their outer faces to form channels for the electrolyte, keys between the ribs of opposed plates, rigid end plates, a cushion of elastic vulcanized rubber between each end plate and adjacent conducting plate, and metallic bands to hold the parts assembled.

12. A storage battery consisting of compound electrodes composed of sectional porous non-conducting plates to the inner faces of which the active material of the battery is applied and conducting plates in contact with said active material, the porous plates having ribs on their outer faces to form channels for the electrolyte, a key between the ribs of opposed sections of the plates, rigid end plates having tapered corner chamfers, a cushion of elastic vulcanized rubber between each end plate and adjacent conducting plate, and metallic bands in the chamfers of the end plates to hold the parts assembled.

In testimony whereof I affix my signature in presence of two witnesses.

GUSTAVUS J. JOHNSON.

Witnesses:
J. McRoberts,
H. C. Lust.